United States Patent
Chen et al.

(10) Patent No.: US 8,462,992 B2
(45) Date of Patent: Jun. 11, 2013

(54) METHOD OF CHANGE DETECTION FOR BUILDING MODELS

(75) Inventors: Liang-Chien Chen, Tao-yuan (TW); Chih-Yuan Huang, Taoyuan (TW); Tee-Ann Teo, Johor (MY)

(73) Assignee: National Central University, Jhongli (TW)

( * ) Notice: Subject to any disclaimer, the term of this patent is extended or adjusted under 35 U.S.C. 154(b) by 854 days.

(21) Appl. No.: 12/633,267

(22) Filed: Dec. 8, 2009

(65) Prior Publication Data

US 2010/0150431 A1    Jun. 17, 2010

(30) Foreign Application Priority Data

Dec. 11, 2008    (TW) ............................... 97148247 A

(51) Int. Cl.
*G06K 9/00* (2006.01)

(52) U.S. Cl.
USPC .......................................... 382/113; 382/154

(58) Field of Classification Search
None
See application file for complete search history.

(56) References Cited

U.S. PATENT DOCUMENTS

2006/0228019 A1* 10/2006 Rahmes et al. ............... 382/154

OTHER PUBLICATIONS

Chen et al., 2008, Change Detection of Building Models From Multi-Source Geodata, In Proceedings of Asian Conference on Remote Sensing, Nov. 10-14, Colombo, Sri Lanka, 6 pages.*
Huertas et al., Detecting Changes in Aerial Views of Man-Made Structures, IEEE Publication, Computer Vision, 1998. Sixth International Conference on , vol., no., pp. 73-80, Jan. 4-7, 1998.*
Frank Jung, Detecting Building Changes from Multitemporal Aerial Stereopairs, ISPRS Journal of Photogrammetry and Remote Sensing 58 (2004), pp. 187-201.*
Matikainen et al., Automatic Detection of Buildings from Laser Scanner Data from Map Updating; publisher unknown, publication year believed to be 2004, 7 pages.*
Murakami et al., Change Detection of Buildings using an Airborne Laser Scanner, ISPRS Journal of Photogrammetry and Remote Sensing 54 (1999), pp. 148-152.*
T. Vogtle et al., Detection and Recognition of Changes in Building Geometry Derived From Multitemporal Laserscanning Data, The International Archives of the Photogrammetry, Remote Sensing and Spatial Information Sciences, vol. 34, Part XXX, published 2004, 6 pages.*
Vu et al., LIDAR-based Change Detection of Buildings in Dense Urban Areas, IEEE publication, 2004, 4 pages.*

* cited by examiner

*Primary Examiner* — Brian P Werner
(74) *Attorney, Agent, or Firm* — Jackson IPG PLLC

(57) ABSTRACT

Lidar point clouds and multi-spectral aerial images are integrated for change detection of building models. This reduces errors owing to ground areas and vegetation areas. Manifold change types are detected with low cost, low inaccuracy and high efficiency.

8 Claims, 8 Drawing Sheets

|  | No change | Main-structure change | Micro-structure change | Vegetation occluded | Change of building demolished |
|---|---|---|---|---|---|
| Later-period height | high | high | high | high | low |
| Later-period NDVI | low | low | low | high | - |
| Ratio of large height differences | low | high | low | - | high |
| Area of large height differences | low | high | medium | - | high |

FIG.4

|  | Undefined | N/A | No change | Main-structure | Micro-structure | Demolished | Vegetation | Total |
|---|---|---|---|---|---|---|---|---|
| No change | 23 | 22 | 288 | 10 | 19 | 0 | 5 | 367 |
| Main-structure | 0 | 0 | 1 | 9 | 0 | 0 | 0 | 10 |
| Micro-structure | 0 | 0 | 0 | 0 | 9 | 0 | 0 | 9 |
| Demolished | 0 | 0 | 0 | 0 | 0 | 15 | 0 | 15 |
| Vegetation | 0 | 0 | 0 | 0 | 0 | 0 | 19 | 19 |
| Total | 23 | 22 | 289 | 19 | 28 | 15 | 24 | 420 |
|  |  |  |  |  |  | Correct identified |  | 340 |

FIG.6

|  | No change | Main structure | Micro-structure | Demolished | Vegetation | Overall |
|---|---|---|---|---|---|---|
| Overall accuracy | - | - | - | - | - | 85.4% |
| Omission error | 16.5% | 10.0% | 0.0% | 0.0% | 0.0% | 5.3% |
| Commission error | 0.4% | 52.6% | 67.9% | 0.0% | 20.8% | 28.3% |
| Kappa | 0.397 | 0.895 | 1.000 | 1.000 | 1.000 | 0.599 |

FIG.7

METHOD OF CHANGE DETECTION FOR BUILDING MODELS

FIELD OF THE INVENTION

The present invention relates to detecting changes of buildings. More particularly, it relates to integrating later-period lidar point clouds and later-period multi-spectral aerial images to detect changes in earlier-period three-dimensional (3D) building models.

DESCRIPTION OF THE RELATED ART

Nowadays, building models cannot be fully updated automatically, so it takes time to reconstruct them. If only changed buildings are considered on the reconstruction stage, processing time can be saved with efficiency improved. Hence, the detection of changed building becomes more and more important.

There are various traditional change detection methods. For example, (1) Multi-temporal Lidar data are divided into homogenous regions to find building areas for comparison. (2) Using an earlier-period vector map as training data for finding building in later-period, then earlier data are used for comparison. (3) Change types are identified from an earlier-period geographic information systems (GIS) layer or vector map and a later-period image. (4) Change types can be judged from relationships between two-temporal lidar points. (5) Height differences of points between an earlier-period digital surface model (DSM) and a later-period DSM are calculated. (6) Edges are detected for comparing the earlier-period and the later-period images. (7) Decision tree is applied for determination building changes with edge features. (8) Membership can be generated by fuzzy set theory with gray value or height difference.

However, in FIG. 8, the changed types of the building models only comprise 'changed' 41, 'unchanged' 42 and 'undefined' 43, which are not satisfied to actual uses. In fact, changed types should include new buildings constructed after original buildings demolished; built or demolished micro structure on roofs like staircase; and buildings demolished into ground. Furthermore, by using remote sensing, areas of undefined changed type mostly come from vegetation occluded buildings. As the influences of vegetation areas to the change detection are often ignored. The detection errors are often found.

Traditionally, spectral differences of multi-temporal images are used for change detection. Yet, only two-dimensional (2D) information without 3D information is provided so that a change in shape but not that in spectrum is hard to be found. Besides, on developing a method for detecting more change types, more characteristics are in need for identification; and, if undefined attributes are found, errors may be also found on gathering statistics by using traditional methods.

Change identification is a process of classification and a selection of a characteristic used as a basic unit becomes a general concern for the classification. Point characteristic may be selected to find detail changes by sacrificing bulk properties; line characteristic may be selected to find more shape information while being influenced by non-3D lines; and, plane characteristic may be selected to contain most information but changes in small area may not be found.

Building models are used recently; however, data of the building models are temporal as a traditional map. And, traditional change detection methods often use 2D spectral information but not 3D shape information, while change types are few. Hence, the prior arts do not fulfill all users' requests on actual use.

SUMMARY OF THE INVENTION

The main purpose of the present invention is to integrate later-period lidar point clouds and later-period multi-spectral aerial images for detecting changes of buildings in earlier-period 3D building models.

The second purpose of the present invention is to detect change types of areas of 3D building models with low cost, low inaccuracy, high efficiency and manifold change types.

To achieve the above purposes, the present invention is a method of building model change detection, comprising steps of: (a) after data co-registration, detection of ground areas and vegetation areas, and discrete point elimination on ground and vegetation areas, calculating height differences of points between earlier-period 3D building models and later-period lidar point clouds; and (b) categorizing points having height differences to decide change types of the 3D building models hierarchically, where the change types of the 3D building models comprises no change, main-structure change, micro-structure change, change of building demolished, vegetation occluded and undefined change. Accordingly, a novel method of change detection of building models is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing the preferred embodiment according to the present invention;

FIG. 4 is the view showing the characteristics of the change types;

FIG. 6 is the view showing the error matrix of the change types;

FIG. 7 is the view showing the accuracy indexes; and

DESCRIPTIONS OF THE PREFERRED EMBODIMENTS

The following description of the preferred embodiment is provided to understand the features and the structures of the present invention.

Figure 1:
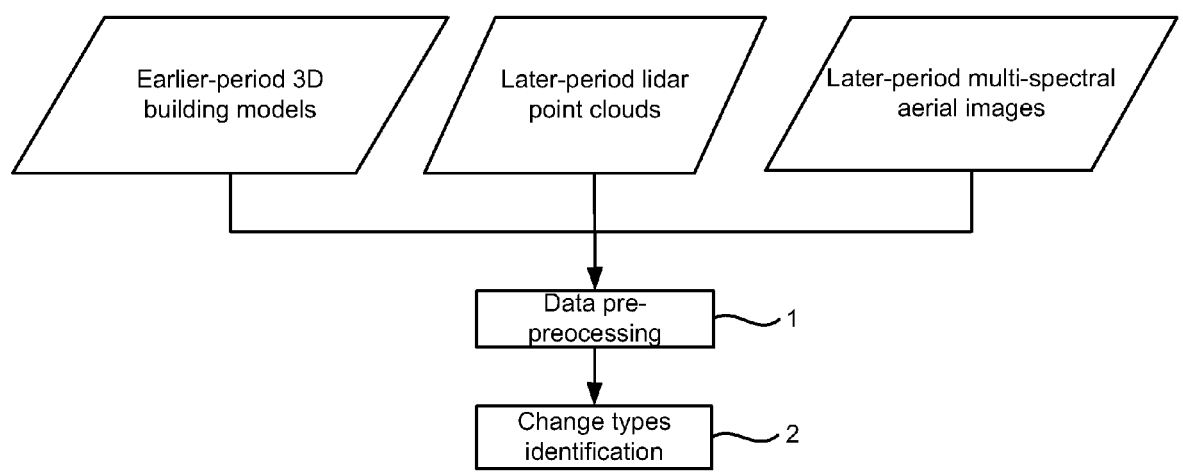
Figure 2:
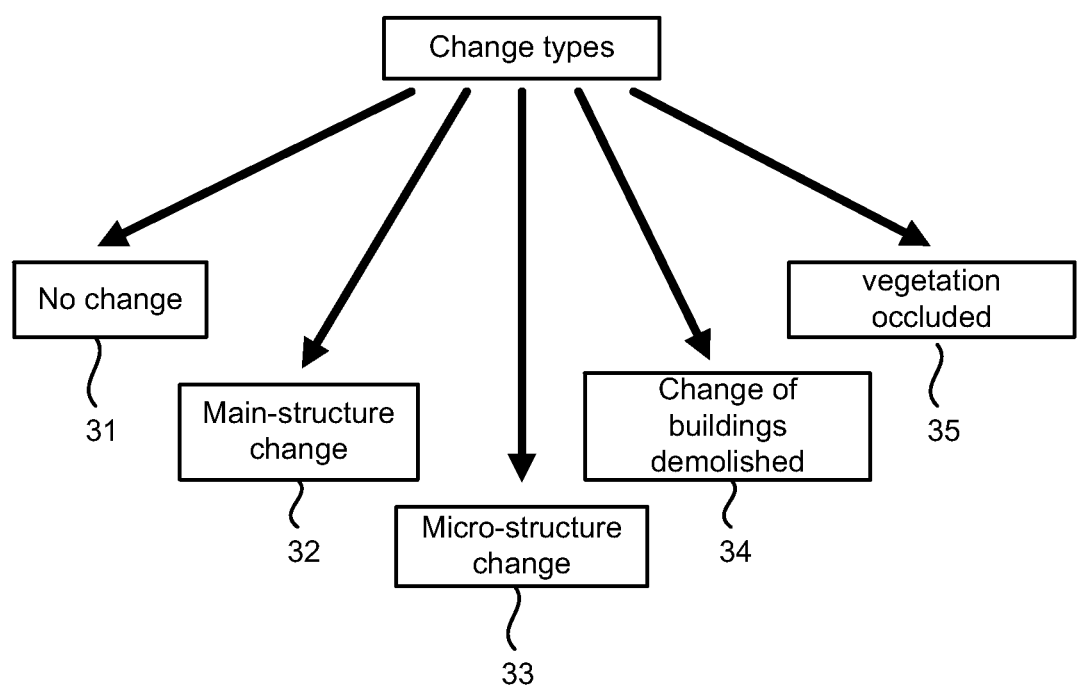
FIG. 2 is the view showing the change types.

Please refer to FIG. 1 and FIG. 2, which are a flow view showing a preferred embodiment and a view showing change types according to the present invention. As shown in the figures, the present invention is a method of building model change detection, where later-period lidar point clouds and later-period multi-spectral aerial images are integrated for a change detection of earlier-period 3D building models. The present invention comprises the following steps:

(a) Data pre-processing 1: After data co-registration, detection of ground areas and vegetation areas, and discrete point elimination on ground areas and vegetation areas, height differences between earlier-period 3D building models and later-period lidar point clouds are calculated.

(b) Change type identification 2: The points having height differences between the earlier-period 3D building models and the later-period lidar point clouds are categorized; and change types of the 3D building models are identified hierarchically.

Therein, the points having height differences comprise various areas in the earlier-period 3D building models and ground and vegetation areas in the later-period lidar point clouds; the later-period lidar point clouds and multi-spectral aerial images comprise areas having spectrums of red, green, blue and infrared light; the change types considered in the present invention comprises: main-structure change, i.e. new building constructed after original building demolished; micro-structure change, i.e. staircases constructed or original micro-structure demolished; and change of building demolished. However, vegetation occluded buildings are often found to be in lack of data owing to the buildings occluded. Therefore, five change types, including no change 31, main-structure change 32, micro-structure change 33, change of building demolished 34 and vegetation occluded 35, in the building models are auto-detected.

Figure 3:
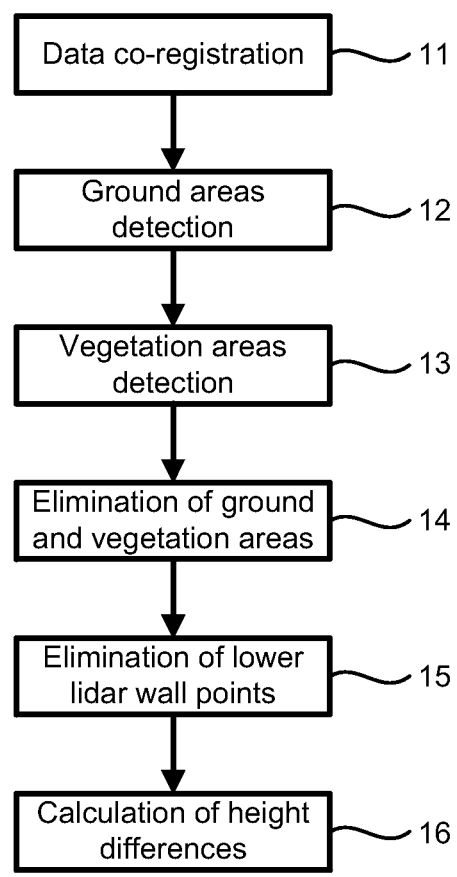
FIG. 3 is the flow view showing the data pre-processing.

Please refer to FIG. 3, which is a flow view showing data pre-processing. As shown in the figure, data pre-processing according to the present invention comprises data co-registration; ground areas detection; vegetation areas detection; elimination of lidar point clouds in ground and vegetation areas; elimination of lower lidar wall points; and calculation of height differences of points between earlier-period building models and later-period lidar points. The data pre-processing comprises the following steps:

(a1) Data co-registration 11: 3D coordinates of control points are obtained by identifying and measuring building corners of earlier-period 3D building models, later-period lidar point clouds and later-period multi-spectral stereo-aerial images.

(a2) Ground areas detection 12: A digital surface model (DSM) of land surface elevation and a digital elevation model (DEM) of ground elevation are obtained from the lidar point clouds. Heights in DEM are subtracted from heights in DSM to obtain a normalized digital surface model (nDSM). Then, a height threshold of ground is set to indentify ground areas.

(a3) Vegetation areas detection 13: First, for non-occluded area, normalized difference vegetation indexes (NDVI) are calculated from areas having spectrums of red light and infrared light in the aerial image to obtain vegetation areas. Then, for the occluded area, vegetation areas are identified from a texture image of the nDSM through a maximum likelihood classification while using the previous detected vegetation areas as training data. Thus, complete vegetation areas are obtained (a4) Elimination of ground and vegetation areas 14: The lidar point clouds in ground and vegetation areas are eliminated.

(a5) Elimination of lower lidar wall points 15: Triangulated irregular networks (TIN) are formed from the lidar point clouds after eliminating points in the ground and vegetation areas. Vertical triangles are obtained through judging normal vectors of the TIN. Then, wall points, which are lowest points of the vertical triangles, are eliminated.

(a6) Calculation of height differences 16: Plane equations of roofs are obtained by calculating coordinates of the building corners. Then, height distances between roofs and the lidar point clouds are calculated.

Please refer to FIG. 4, which is a view showing characteristics of change types. As shown in the figure, characteristics of the change types 31~35 in FIG. 2 comprises a later-period height, a later-period NDVI, a ratio of large height differences and an area measure of the large height differences, where 'high', 'medium' and 'low' are used to express related strengths of the change types 31~35 and '–' means no specific strength, either high or low.

By comparing the related strengths, demolished buildings are identified from the later-period height. Vegetation occluded buildings have large later-period NDVI. Main-structure and micro-structure changes are identified by ratios of the large height differences. Buildings of no change have a smallest area of the large height differences. Therein, demolished buildings are ground areas in the later period; heights in the later period are obtained by detecting ground areas in the later-period lidar point clouds; and, the later-period NDVI of the vegetation occluded buildings are obtained by detecting vegetation areas in the multi-spectral images.

Furthermore, because the demolished buildings have no special expressions in the later-period NDVI and the demolished buildings are identified by the later-period height, the demolished buildings are determined before vegetation occluded buildings. Because the vegetation occluded buildings have no special expressions in ratio and area of large height differences, the vegetation occluded buildings are determined before identifying unchanged areas, main-structure changed buildings and micro-structure changed buildings.

Change types are obtained by categorizing points having height differences into changed points and unchanged points with a threshold in step (b). Then, a number of points of each roof plane are obtained through a method of point in polygon and, furthermore, point densities of the roof planes are thus obtained. At last, change area and change ratio in roof planes, i.e. large height differences, are obtained through the following formulas:

$$\text{ratio-of-change} = \text{changed points/total points} \times 100\%,$$
and
$$\text{area-of-change} = \text{changed points/total point densities}$$

Since no change and main-structure change are overall trends, they are identified by change ratio. Because micro-structure change is a partial change, it is identified by area of change. However, on identifying the main-structure change by change ratio and the micro-structure change by changed area, the main-structure change should be identified before the micro-structure change or mistakes happen. Also, because the micro-structure change has a smaller change ratio in large building, the micro-structure change is identified before no change.

Figure 5:
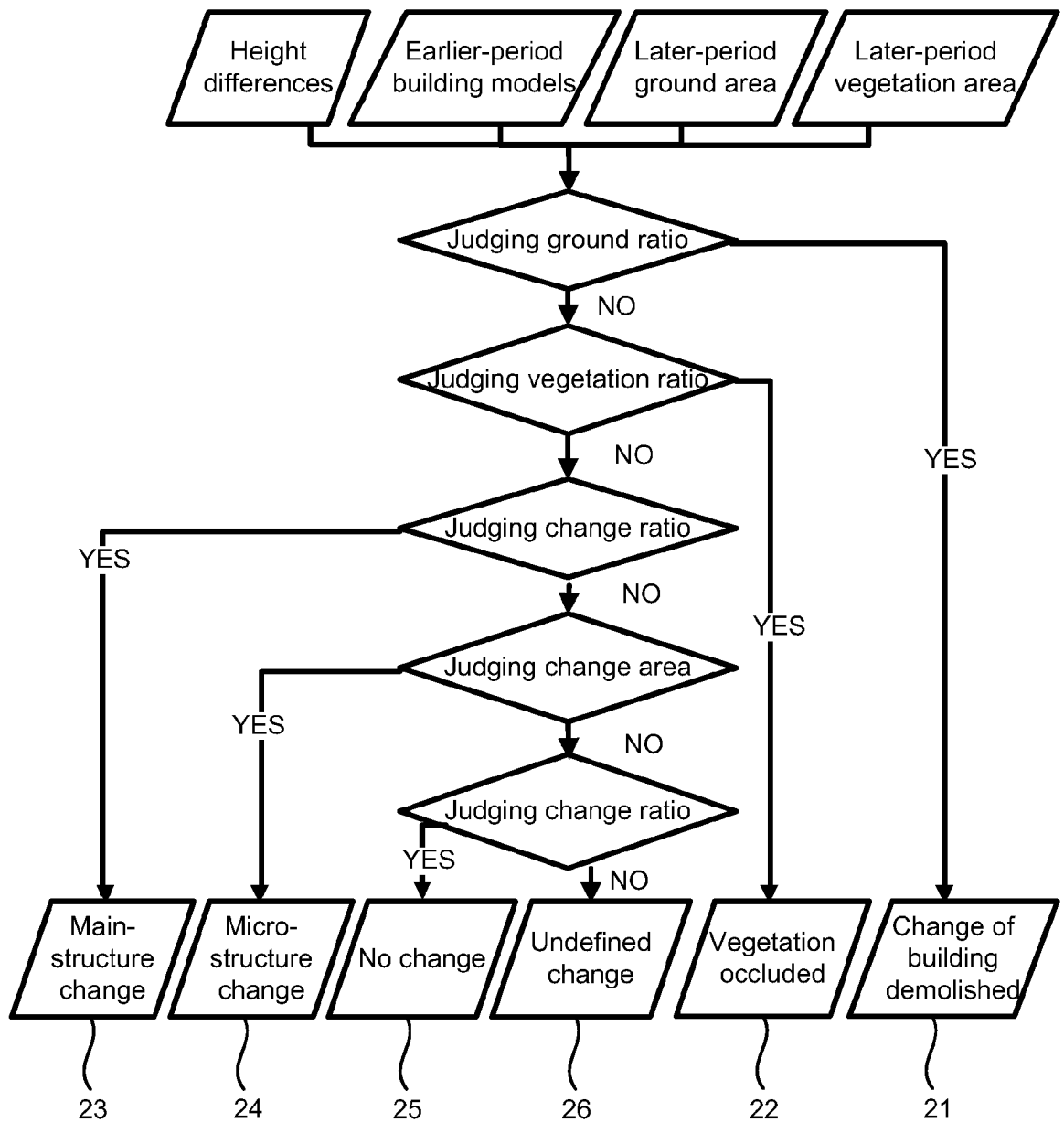
FIG. 5 is the view showing the change types determination flow of the three-dimensional (3D) building models
Figure 8:
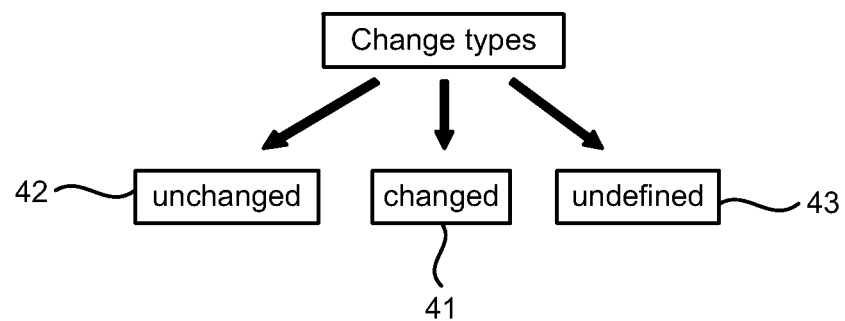
FIG. 8 is the view of the traditional change types.

Please refer to FIG. 5, which is a view showing change types determination flow of three-dimensional (3D) building models. As shown in the figure, change types are obtained by gathering statistics step by step, comprising the following steps:

(b1) Identifying buildings demolished 21: Since buildings demolished are ground areas in later period, they are identified by judging whether ratio of ground area is bigger than a first ratio threshold.

(b2) Identifying vegetation occluded buildings 22: Vegetation occluded buildings are buildings whose roofs are mostly occluded by vegetation. Vegetation occluded buildings are identified by judging whether ratio of vegetation area is bigger than a second ratio threshold.

(b3) Identifying main-structure changed buildings 23: Main-structure changed buildings are identified by judging whether change ratio is bigger than a third ratio threshold.

(b4) Identifying micro-structure changed buildings 24: Micro-structure changed buildings are identified by judging whether change area is bigger than an area threshold.

(b5) Identifying unchanged areas 25: Unchanged areas are identified by judging whether change ratio is smaller than a fourth ratio threshold.

(b6) Identifying undefined areas 26: After processing step (b1) to step (b5), buildings left are identified as undefined areas.

Therein, if a pixel number or lidar point of a building element is too few for identification, the element is treated as 'change type not available'. Hence, all elements are identified step by step into categories of unchanged areas, main-structure changed buildings, micro-structure changed buildings, demolished buildings, vegetation occluded buildings, undefined areas and 'change type not available' areas.

Please refer to FIG. 6 and FIG. 7, which are a view showing an error matrix of change types; and a view showing accuracy indexes. As shown in the figures, on using the present invention, earlier-period 3D building models, an earlier-period multi-spectral aerial image and a later-period multi-spectral aerial image are used to generate reference data by manually identifying change types. As a result shows, there are 367 unchanged areas, 10 main-structure changed buildings, 9 micro-structure changed buildings, 15 demolished buildings, and 19 vegetation occluded buildings. In FIG. 6, an error matrix of change types is thus obtained by gathering statistics from the reference data; and, accuracy indexes of the change types are further calculated from the error matrix regardless of 'change type not available' areas. In FIG. 7, the accuracy indexes contain an overall accuracy, an omission error, a commission error, and a Kappa accuracy index. Therein, a Kappa value of 1 means a perfect identification; 0 means the same identification result is obtained as that from a random selection; 0.6 means a good identification; and 0.8 means an excellent identification. Hence, it is clear that the present invention has good performance on change type identification with an overall accuracy of 85% and an overall Kappa value of 0.6.

All in all, the present invention has the following advantages:

1. Later-period lidar point clouds and later-period multi-spectral aerial images are integrated to reduce errors in change detection owing to ground areas and vegetation areas. With the change type detection flow, manifold change types are detected hierarchically.

2. Later-period shape information are used for change detection with a consideration of 3D shape differences to avoid inaccuracy owing to insufficient spectral difference while 2-dimensional spectrum information are the same but elevation changes.

3. Planes are used as basic units for conveniently integrating information. And to detect minor change types by setting thresholds to overcome over-entirety and to detect micro-structure changes of buildings.

4. Earlier-period 3D building models are used for change detection to reduce cost by renewing information only on changed areas.

To sum up, the present invention is a method of building model change detection, where later-period lidar point clouds and later-period multi-spectral aerial images are integrated for change detection of earlier-period 3D building models with low cost, low inaccuracy, high efficiency and manifold change types.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of building model change detection, comprising steps of:
   (a) after data co-registration, detection of ground areas and vegetation areas, and discrete point elimination on ground areas and vegetation areas, calculating height differences between earlier-period three-dimensional (3D) building models and later-period lidar point clouds; and
   (b) categorizing said points having height differences to decide change types of said 3D building models step by step,
   wherein said later-period lidar point clouds has later-period ground areas and later-period vegetation areas; and
   wherein said change types of said 3D building models comprises no change, main-structure change, micro-structure change, change of building demolished, vegetation occluded, and undefined change,
   wherein, in step (a), there are steps of:
   (a1) through data co-registration of said earlier-period 3D building models, said later-period lidar point clouds and later-period multi-spectral stereo-aerial images, obtaining 3D coordinates of control points by identifying and measuring building corners of said building models, said lidar point clouds and said aerial images;
   (a2) obtaining a digital surface model (DSM) of land surface elevation and a digital elevation model (DEM) of ground elevation from said lidar point clouds; subtracting heights in DEM from heights in DSM to obtain a normalized digital surface model (nDSM); and setting a height threshold of ground to identify ground areas;
   (a3) obtaining normalized difference vegetation indexes (NDVI) from areas having spectrums of red light and infrared light in said aerial images to obtain vegetation areas in unoccluded image areas; and, for occluded image areas, obtaining vegetation areas from a texture image of said nDSM through a maximum likelihood classification while using said detected vegetation areas as training data;
   (a4) eliminating said lidar point clouds on said ground areas and said vegetation areas;
   (a5) obtaining triangulated irregular networks (TIN) from said lidar point clouds after eliminating said ground areas and said vegetation areas; obtaining vertical triangles through judging normal vectors of said TIN; and eliminating wall points which are lowest points of said vertical triangles; and
   (a6) obtaining plane equations of roofs by calculating coordinates of said building corners and obtaining height distances between roofs of said lidar point clouds and roofs of said building models.

2. The method according to claim 1,
   wherein characteristics of each of said change types comprises a later-period height, a later-period NDVI, a ratio of large height differences and an area of said large height differences; and
   wherein said heights in later period and said later-period NDVI are obtained from said ground areas and said vegetation areas.

3. The method according to claim 1,
   wherein said change types are obtained in the following sequence:
   (i) demolished buildings are obtained before vegetation occluded buildings;
   (ii) said vegetation occluded buildings are obtained before main-structure changed buildings;

(iii) said main-structure changed buildings are obtained before micro-structure changed buildings; and
(iv) said micro-structure changed buildings are obtained before unchanged areas.

4. The method according to claim 1,
wherein said change types are obtained step by step, comprising the following steps of:
(b1) judging whether a ratio of each ground area is bigger than a first ratio threshold to obtain buildings demolished;
(b2) judging whether a ratio of each vegetation area is bigger than a second ratio threshold to obtain vegetation occluded buildings;
(b3) judging whether a change ratio of each building element is bigger than a third ratio threshold to obtain main-structure changed buildings;
(b4) judging whether a change area of each building element is bigger than an area threshold to obtain micro-structure changed buildings;
(b5) judging whether a change ratio of each building element is smaller than a fourth ratio threshold to obtain unchanged areas; and
(b6) obtaining building elements left after processing step (b1) to step (b5) and identifying said elements left as undefined areas.

5. The method according to claim 4,
wherein accuracy indexes of said change types are obtained from said error matrix; and
wherein said accuracy index is selected from a group consisting of an overall accuracy, an omission error, a commission error, and a Kappa accuracy index.

6. The method according to claim 1,
wherein an aerial image has areas having spectrums of red light, green light, blue light and infrared light.

7. A method of building model change detection, comprising steps of:
(a) after data co-registration, detection of ground areas and vegetation areas, and discrete point elimination on ground areas and vegetation areas, calculating height differences between earlier-period three-dimensional (3D) building models and later-period lidar point clouds; and
(b) categorizing said points having height differences to decide change types of said 3D building models step by step,
wherein said later-period lidar point clouds has later-period ground areas and later-period vegetation areas; and
wherein said change types of said 3D building models comprises no change, main-structure change, micro-structure change, change of building demolished, vegetation occluded, and undefined change,
wherein, in step (b), said change types are obtained through: categorizing said points having height differences into changed points and unchanged points with a threshold; and obtaining a point density of each roof plane with a number of points of each said roof plane through a method of point in polygon to obtain change areas and change ratios in said roof planes.

8. The method according to claim 7,
wherein said change areas and said change ratios in said roof planes are obtained through the following formulas:

$$\text{ratio-of-change} = \text{changed points}/\text{total points} \times 100\%,$$
and $$\text{area-of-change} = \text{changed points}/\text{total point densities}.$$

* * * * *